United States Patent [19]

Rohrer

[11] 4,307,313
[45] Dec. 22, 1981

[54] MULTI-LAYER TWISTED CONDUCTOR WINDING FOR ELECTRICAL MACHINES

[75] Inventor: Hansjürg Rohrer, Windisch, Switzerland

[73] Assignee: BBC Brown, Boveri & Co. Ltd., Baden, Switzerland

[21] Appl. No.: 53,353

[22] Filed: Jun. 29, 1979

[30] Foreign Application Priority Data

Jun. 29, 1978 [CH] Switzerland .................... 7080/78

[51] Int. Cl.³ ............................................. H02K 3/14
[52] U.S. Cl. .................................................. 310/213
[58] Field of Search ................... 310/213; 174/34; 336/187

[56] References Cited

U.S. PATENT DOCUMENTS

| | | | |
|---|---|---|---|
| 1,643,178 | 9/1927 | Savage | 310/213 |
| 1,677,007 | 7/1928 | Summers | 310/213 |
| 3,185,872 | 5/1965 | Weissheimer | 310/213 |
| 3,585,428 | 6/1971 | Bennington | 310/213 |
| 3,821,574 | 6/1972 | Ruelle | 310/213 |
| 3,825,783 | 7/1974 | Duffert | 310/213 |

FOREIGN PATENT DOCUMENTS

| | | | |
|---|---|---|---|
| 277012 | 3/1912 | Fed. Rep. of Germany | 310/213 |
| 311868 | 3/1927 | Fed. Rep. of Germany | 310/313 |

OTHER PUBLICATIONS

"Herstellung der Wicklungen electrischer Maschinen", Sequenz, Springer-Verlag, Wien, 1973.

*Primary Examiner*—R. Skudy
*Attorney, Agent, or Firm*—Burns, Doane, Swecker & Mathis

[57] ABSTRACT

A coil for a two or multi-layer winding of an electrical machine includes twisted subconductors in each coil side and an end portion connecting the subconductors of each coil side. The degree of twist in each coil side is less than a full turn of 360°. If the subconductors in the end portion are parallel to one another, the direction of twist in each coil side is the same. If the subconductors in the end portion reverse their positions, the directions of twist in the two coil sides are opposite.

3 Claims, 4 Drawing Figures

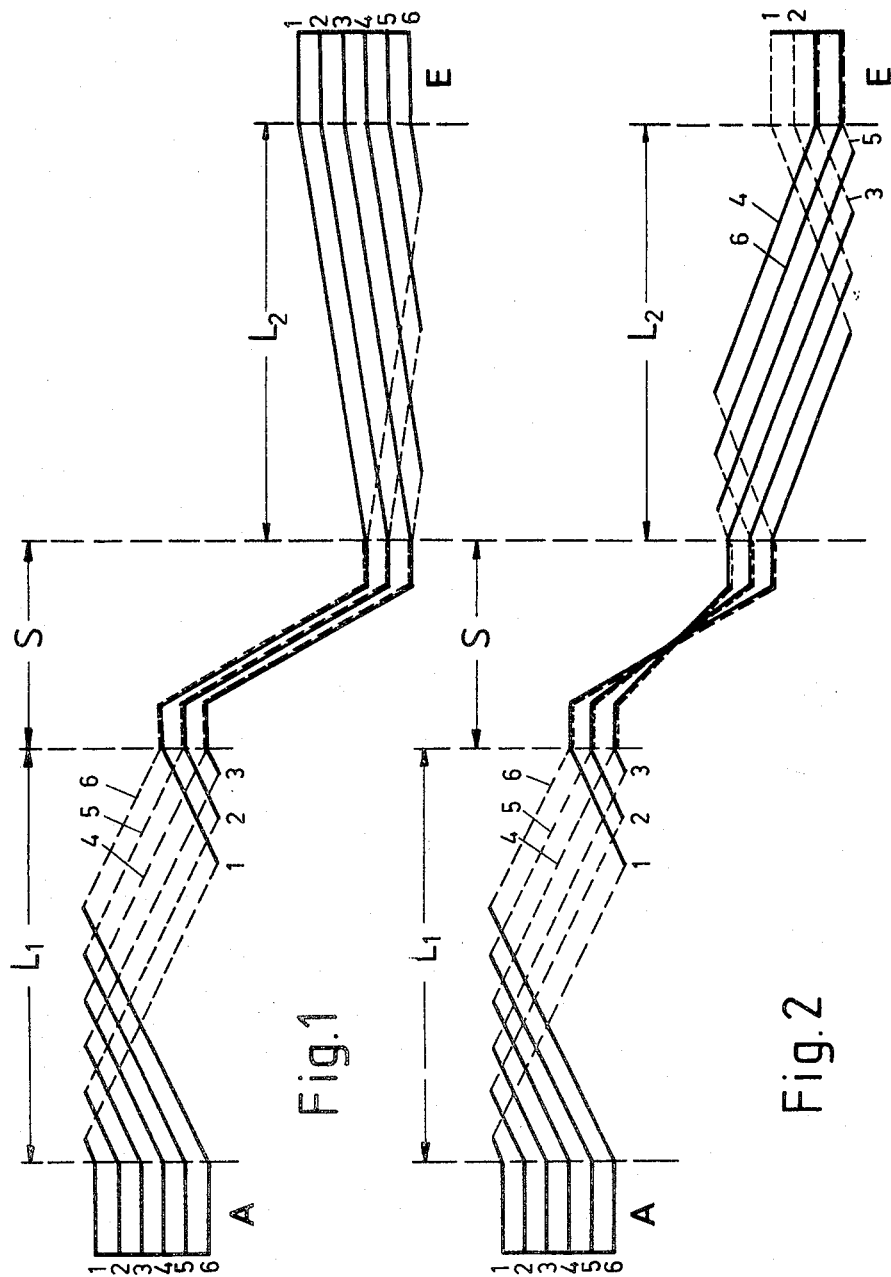

MULTI-LAYER TWISTED CONDUCTOR WINDING FOR ELECTRICAL MACHINES

BACKGROUND OF THE INVENTION

This invention relates to a two-layer or a multi-layer winding for electrical machines, which winding consists of coils comprising conductor bars which have active portions, connected together by end portions. The invention relates more particularly to such a winding in which the conductor bars comprise mutually twisted and individually insulated subconductors, the twist being continued over more than one consecutive conductor bar and the subconductor insulation being continuous over the end portions.

Alternating current-carrying windings for electrical machines of high current loading are commonly built of specially designed conductor bars. These bars comprise a number of subconductors which are mutually insulated and are arranged so as to pass at least once through every level in the bar cross-section along the active length. Due to the fine subdivision of the conductors, skin effect losses can be considerably reduced in comparison to an equally sized solid conductor bar. A consequence of each subconductor occupying all levels in the conductor bar is that each subconductor is linked by nearly the same flux, which practically eliminates internal circulating currents amongst the different subconductors.

A conductor bar known as the Roebel bar has proved to be technically the most advantageous, and among all known types of compensated conductor bars it has won the widest acceptance. Such a bar is disclosed for example in the German Pat. No. 277012. This conductor bar consists of two adjacent stacks of flat subconductors twisted together over the active length of the machine. Each subconductor executes a 360° total twist at uniform pitch over the active length so that each subconductor in the bar is wrapped once uniformly about all of the others.

In electrical machines of comparatively short axial length, it is not always possible to attain a full 360° of twist within the active length of the bar. To reduce the number of crossovers in a twisted bar it has been proposed, e.g. in the German Pat. No. 311868, to distribute the total 360° twist over the active portions of two conductor bars, with the subconductor insulation maintained over the interconnecting end portion. In the case of a one-layer winding this arrangement achieves complete suppression of the parasitic currents which flow amongst the individual subconductors and which are referred to as circulating currents. The statement, in the above mentioned patent 311868, that complete compensation of circulating currents is also achieved in this way for a two-layer winding is only true if the transverse leakage flux density distribution over the radial height of the two layers is linear which is not necessarily the case.

OBJECTS AND SUMMARY OF THE INVENTION

It is therefore an object of the present invention to provide a novel two-layer or multi-layer winding comprising coils which comprise mutually twisted subconductors and which offer maximum suppression of circulating currents even in the case of short active-length machines. It is another object of the present invention to provide a novel winding of this type which can be produced simply and economically.

These as well as other objects and advantages are achieved, in accordance with the present invention, by twisting the subconductors less than 360° in each of the lower and upper layer coil sides and distributing the twist in both the coil sides uniformly over the total active length.

The present invention provides the following advantages:

it enables machines having comparatively short active length, to be provided with twisted subconductor coils which keeps circulating current losses to a minimum in cases where the active length of the machine is not restrictive, the number of cross-overs per bar can be reduced which simplifies the production of the winding. In addition the conductor twist has a longer pitch so that the bar cross-section is better utilized.

In electrical machines in which the height co-ordinate of each mutually insulated subconductor in the bar cross-section is the same at the end of one active portion and at the start of the following active portion, i.e. parallel continuation of the subconductors over the end portion, the twist of the subconductors in the lower-layer coil sides is between 30° and 180° and in the upper-layer coil sides between 240° and 300°, the direction of twist in both types of coil side being the same. The best suppression of circulating currents is achieved by a lower-layer twist of 90° (one quarter rotation) and an upper-layer twist of 270° (three quarters rotation). In one exemplary embodiment of this feature of the invention, the residual circulating current losses in the machine amount to less than 5% of the total $I^2R$ losses.

In electrical machines in which the positions of the subconductors in the bar cross-section are reversed from the end of one active portion to the start of the next active portion, i.e. the subconductors are arranged to reverse in the end portion of the coil, the best results have been obtained by selecting an angle of twist of between 200° and 300° for both lower-layer and upper-layer coil sides. In this case the lower-layer and upper-layer coil sides have opposite directions of twist. In one embodiment of this feature of the invention the optimum between extra costs incurred in providing twist, and the savings due to suppression of circulating current losses is given by a twist of 210° in the lower layers and 270° in the upper layers. The residual circulating current losses in this case are about 20% of the $I^2R$ losses.

BRIEF DESCRIPTION OF THE DRAWINGS

A more complete understanding of the present invention will be obtained from a perusal of the following detailed description which refers to the four attached figures.

FIG. 1 is a schematic side view of the two consecutive Roebel bars in a coil, having a parallel continuation of the subconductors over the end portion.

FIG. 2 is a schematic side view of the two consecutive Roebel bars in a coil, having a reversed continuation of the subconductors over the end portion.

DETAILED DESCRIPTION

In accordance with the usual diagrammatic representation of twisted subconductor bars used in the literature, the schematic side views of the conductor bars in FIGS. 1 and 2 show the straightened out subconductor paths of one stack in the coil with the near-side subconductor paths in solid lines and the far side subconductor paths in broken lines. Reference is made, for example, to the book by H. Sequenz, entitled *Herstellung der Wicklungen elektrischer Maschinen* (Production of Windings of Electrical Machines), Springer-Verlag, Vienna, New York, 1973, pp. 70 ff. for examples of such illustrations. In addition, and in order to make the illustration of the invention clearer, the second stack of subconductors is not shown in either figure. In this connection, reference is made to the previously mentioned book by Sequenz, page 71, and in particular to FIG. 18, and FIG. 5 of German Pat. No. 277012, where the interleaving of both conductor stacks is shown in detail.

Figure 3:
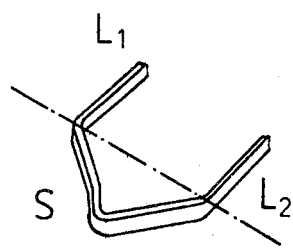
FIG. 3 is a perspective view of an end portion of a coil having parallel continuation of the subconductors.

In FIGS. 1 and 2, $L_1$ and $L_2$ are the active portions of the coil and are disposed in two of the slots of an electrical machine. The end portions are labelled S. The mutually-insulated upper-layer subconductors 1–6 in the coil side $L_1$ in the embodiment shown in FIG. 1 are uniformly twisted by 270° over the entire slot length or active length. The mutually insulated subconductors 1–6 continue parallel to each other over the end portion, i.e. the height co-ordinate of the subconductors in the bar cross section leaving the first slot is the same as the height co-ordinate at the entry to the next slot, as illustrated in FIG. 3. In the lower-layer active length $L_2$ the mutually insulated subconductors 1–6 are uniformly twisted by 90° over the slot length or active length of the bar. At both ends A and E of the coil all the subconductors are connected electrically together. The direction of twist is the same in both bars $L_1$ and $L_2$.

Figure 4:
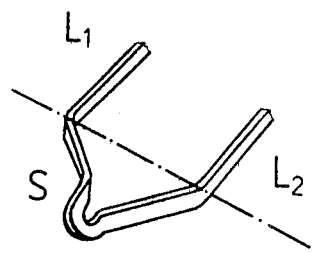
FIG. 4 is a perspective view of an end portion of a coil having reversed continuation of the subconductors.

In the embodiment of FIG. 2 the subconductors 1–6 in the upper coil side $L_1$ are twisted uniformly over the entire slot or active length by 270°. In the end portion S the subconductors are mutually insulated and their arrangement is reversed i.e. the sequence of the subconductors around the bar cross section is reversed between the exit from the first slot and entry to the next slot, as illustrated in FIG. 4. In the lower-layer coil side $L_2$, the subconductors 1–6 are uniformly twisted by 210° over the entire slot or active length. The direction of twist in the upper-layer coil side $L_1$ is opposite to that in the lower-layer coil side $L_2$. The subconductors are also in this case connected to each other electrically at the ends A and E of the conductor bar.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description and all changes which come within the meaning and range of equivalency of the claims are therefore intended to be embraced therein.

What is claimed is:

1. In a two-layer or multi-layer winding for an electrical machine having conductor components which are twisted together such that the twist of the conductor components in one turn of the winding extends over more than one slot of the electrical machine and wherein the conductor components form mutually insulated end overhangs intermediate two active length portions thereof respectively disposed in slots of the electrical machine, the improvement wherein:

the twist of the conductor components is uniformly distributed over the entire active length portion of each of the upper and lower winding layers;

the conductor components are disposed physically parallel to one another in the end overhang portion of the winding;

the twist of the conductor components within the lower layer active length portion of the winding is in the range from 30° to 180°;

the twist of the conductor components within the upper layer active length portion of the winding is in the range from 240° to 300°; and the direction of the twist of the conductor components is the same for both active length portions of the winding.

2. The winding of claim 1 wherein the lower-layer conductor components are twisted approximately 90° over the active length thereof and the upper-layer conductor components are twisted approximately 270° over the active length thereof.

3. In a two-layer or multi-layer winding for an electrical machine having conductor components which are twisted together such that the twist of the conductor components in one turn of the winding extends over more than one slot of the electrical machine and wherein the conductor components form mutually insulated end overhangs intermediate two active length portions thereof respectively disposed in slots of the electrical machine, the improvement wherein:

the twist of the conductor components is uniformly distributed over the entire active length portion of each of the upper and lower winding layer;

the conductor components cross one another in the end overhang portion of the winding such that the relative positions of the conductor components are reversed between the end of one active length portion and the beginning of an adjacent active length portion of the winding;

the twist of the conductor components within each of the upper-layer and lower-layer active length portions of the winding is in the range from 200° to 300°; and the direction of twist of the conductor components is the opposite for the respective upper-layer and lower-layer active length portions.

* * * * *